United States Patent
Whitney

[11] Patent Number: 5,149,970
[45] Date of Patent: Sep. 22, 1992

[54] DUAL-BAND OPTOELECTRONIC IMAGING APPARATUS INCLUDING "VENETIAN BLIND" DICHROIC PLATE ARRANGEMENT

[75] Inventor: Colin G. Whitney, Agoura Hills, Calif.

[73] Assignee: Hughes Aircraft Company, Los Angeles, Calif.

[21] Appl. No.: 765,798

[22] Filed: Sep. 26, 1991

[51] Int. Cl.$^5$ ............................................. G01J 3/36
[52] U.S. Cl. .................................. 250/339; 250/226; 250/332
[58] Field of Search ............... 250/339, 332, 370.06, 250/349, 353, 226

[56] References Cited

U.S. PATENT DOCUMENTS 4,776,702  10/1988  Yamaba ............................... 250/226
4,996,427  2/1991  Noble et al. ......................... 250/339

Primary Examiner—Carolyn E. Fields
Attorney, Agent, or Firm—R. M. Heald; C. D. Brown; W. K. Denson-Low

[57] ABSTRACT

A "Venetian-blind" assembly of dichroic plates (36) is disposed in front of the entrance aperture (26a) of a Cassegrain-type telescope (26) which constitutes the optical focussing assembly in a tracking system for a guided missile (10) or the like. The plates (36) transmit electromagnetic radiation in a first optical wavelength band such as visible light, and reflect radiation in a second wavelength band such as infrared radiation. The plates (36) are inclined at progressively larger angles relative to the optical axis (22) of the telescope (26) such that the infrared radiation is reflected from a front surface (36a) of one plate (36) and subsequently from a rear surface (36a) of an adjacent plate (36) into the telescope (26) at a predetermined angle to the transmitted visible radiation. The predetermined angle is selected such that the telescope (26) forms separate, laterally displaced optical images (46,50) corresponding to the visible and infrared radiation respectively on separate sections (34a,34b) of a focal plane photodetector array (34). Optical filters (54,52) which pass only the visible and infrared radiation therethrough respectively are disposed in front of the respective sections (34a,34b) of the photodetector array (34) to eliminate optical crosstalk between the two images (46,50).

25 Claims, 2 Drawing Sheets

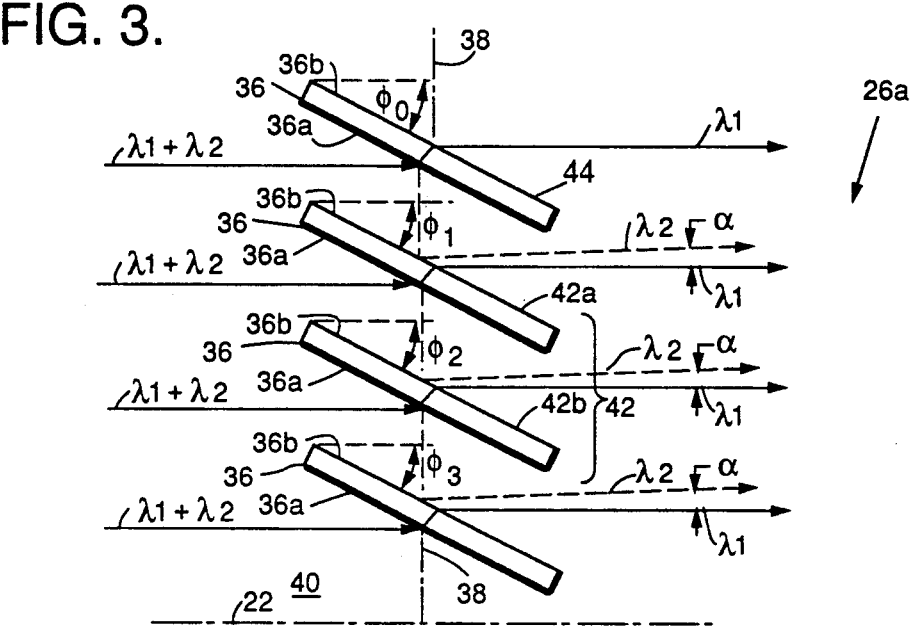
FIG. 3.
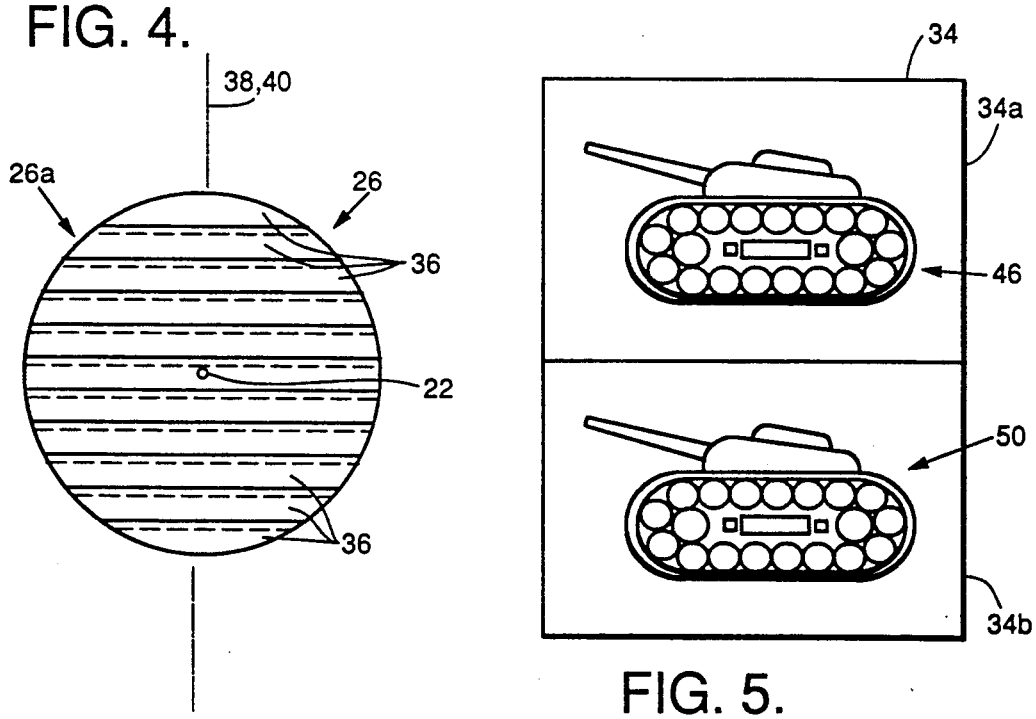
FIG. 4.
FIG. 5.

DUAL-BAND OPTOELECTRONIC IMAGING APPARATUS INCLUDING "VENETIAN BLIND" DICHROIC PLATE ARRANGEMENT

BACKGROUND OF THE INVENTION

1. Field of the Invention

The present invention generally relates to the field of optoelectronic imaging devices, and more specifically to an optoelectronic imaging apparatus for a guided missile tracking system or the like which produces two simultaneous images of a scene or target in different optical wavelength bands.

2. Description of the Related Art

Optoelectronic imaging systems for guided missile tracking and the like are generally of the scanning or staring type. Mechanical scanning systems use motor drives to move mirrors or other scanning elements to scan a scene and sequentially focus optical images of incremental portions of the scene on a linear photodetector array. Electrical signals generated by the array are combined to construct a composite electronic image of the scene. A typical example of a scanning type optoelectronic imaging system is disclosed in "Thermal Imaging System", by J. Lloyd, Plenum Press, 1979, pp. 324-351.

Mechanical scanning systems are limited in speed, due to the inherently slow motor drives and in sensitivity due to the limited number of detectors used. For this reason, "staring" optoelectronic imaging systems have been developed in which an image of the entire scene is focussed by a Cassegrain telescope or other type of optical imaging assembly onto a rectangular focal plane photodetector array. The imaging system continuously "stares at" the entire scene, rather than scanning it. A composite image of the scene is produced by electrically scanning the photodetector elements of the array, which can be much faster than mechanical scanning. An exemplary staring type optoelectronic imaging system is disclosed in "Mitsubishi Thermal Imager Using the 512×512 PtSi Focal Plane Arrays", by S. Fujino et al, in Proceedings of SPIE —The International Society for Optical Engineering Infrared Technology XV, Aug. 7-9, 1989, San Diego, Calif., Vol. 1157, pp. 136-152.

Regardless of type, conventional optoelectronic imaging systems are designed to be sensitive to electromagnetic radiation in one optical wavelength band, for example visible light, medium wavelength infrared (MWIR), or long wavelength infrared (LWIR) radiation. In infrared systems especially, the photodetector array is cooled to reduce parasitic thermal noise and increase the sensitivity. The photodetector array and associated cooling apparatus are mounted in an evacuated chamber or "dewar", which occupies a relatively large portion of the extremely limited space available in a missile tracking system or the like.

In various applications, it is desirable to obtain two simultaneous images of a scene in different optical wavelength bands, such as the visible band and one of the infrared bands. In a missile system, this enables daytime tracking using the visible image, and nighttime tracking using the infrared image. It may also be desirable to obtain simultaneous MWIR and LWIR images.

"Two-color" or "dual-band" scanning systems have been constructed which include a beamsplitter to split the optical image from a telescope into two branches, and a separate photodetector array and appropriate optical bandpass filter in each branch. A system of this type is disclosed in "Conceptual Design of the High-Resolution Imaging Spectrometer (HIRIS) for EOS", by M. Hening, in Proceedings of SPIE —The International Society of Optical Engineering, Remote Sensing, April 3-4, 1986, Orlando, Fla., Vol. 644, pp. 82-85. However, such a system is too large for an application such as a missile tracker since a separate dewar is required for each photodetector array, and the optical paths for the two branches from the beamsplitter occupy an unacceptably large amount of space. In addition, the optical system requires precision alignment, which greatly increases the cost and reduces the reliability of the apparatus. Additional systems have been constructed which can image in two or more spectral bands by mechanically and sequentially inserting different spectral bands into the optical path.

SUMMARY OF THE INVENTION

In accordance with the present invention, a "Venetian-blind" assembly of dichroic plates is disposed in front of the entrance aperture of a Cassegrain-type telescope which constitutes the optical focussing assembly in a tracking system for a guided missile or the like. The plates transmit electromagnetic radiation in a first optical wavelength band such as visible light, and reflect radiation in a second wavelength band such as infrared radiation.

The plates are inclined at progressively larger angles relative to the optical axis of the telescope such that the infrared radiation is reflected from a front surface of one plate and subsequently from a rear surface of an adjacent plate into the telescope at a predetermined angle to the transmitted visible radiation. The predetermined angle is selected such that the telescope forms separate, laterally displaced optical images corresponding to the visible and infrared radiation respectively on separate sections of a focal plane photodetector array. Optical filters which pass only the visible and infrared radiation therethrough respectively are disposed in front of the respective sections of the photodetector array to eliminate optical crosstalk between the two images.

The present optical imaging apparatus requires only one focal plane array, which can be accommodated in a single dewar. In addition, the optical path of the present apparatus does not occupy significantly more space than in a comparable prior art imaging apparatus which produces only a single image. The present invention provides the following specific advantages over the prior art.

1. Highly compact and efficient in utilization of available space.
2. Enables simultaneous imaging in two optical wavelength bands using one focal plane photodetector array.
3. Does not represent a significant increase in complexity over a single color system.

These and other features and advantages of the present invention will be apparent to those skilled in the art from the following detailed description, taken together with the accompanying drawings, in which like reference numerals refer to like parts.

DESCRIPTION OF THE DRAWINGS

FIG. 3 is a partial view similar to FIG. 2 illustrating a "Venetian-blind" dichroic plate assembly of the present apparatus;

FIG. 4 is a front elevation of an entrance aperture of the imaging apparatus further illustrating the dichroic plate arrangement; and FIG. 5 is a diagram illustrating separate optical images in two optical wavelength bands as focussed on a focal plane photodetector array by the present apparatus.

DETAILED DESCRIPTION OF THE INVENTION

Figure 1:
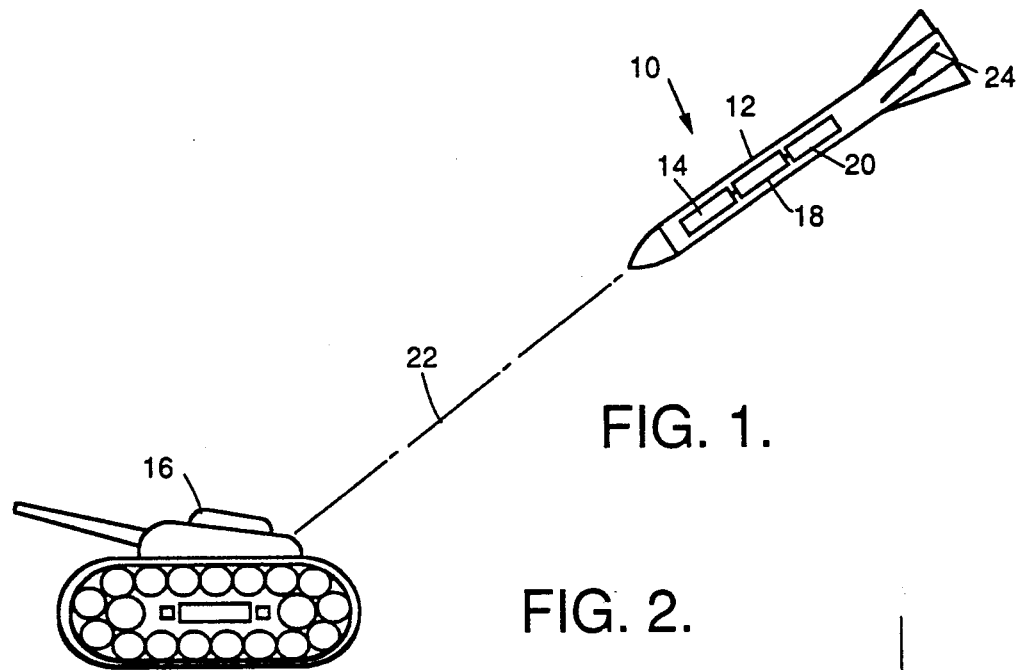
FIG. 1 is a simplified diagram illustrating a guided missile including a tracking system incorporating a dualband optical imaging apparatus embodying the present invention.

As illustrated in FIG. 1, a guided missile 10 embodying the present invention includes an airframe 12 in which is mounted a dual-band optical imaging apparatus 14. The apparatus 14 produces two simultaneous optical images of a scene or target 16 such as a tank in different wavelength bands, and feeds electronic images corresponding to the optical images to a tracking system 18.

A guidance system 20 receives electronic signals from the tracking system 18 indicating the difference between the trajectory of the missile 10 and a line-of-sight or axis 22 to the target 16, and feeds control signals to movable aerodynamic control surfaces such as fins 24 to cause the missile 10 to move toward the axis 22.

Figure 2:
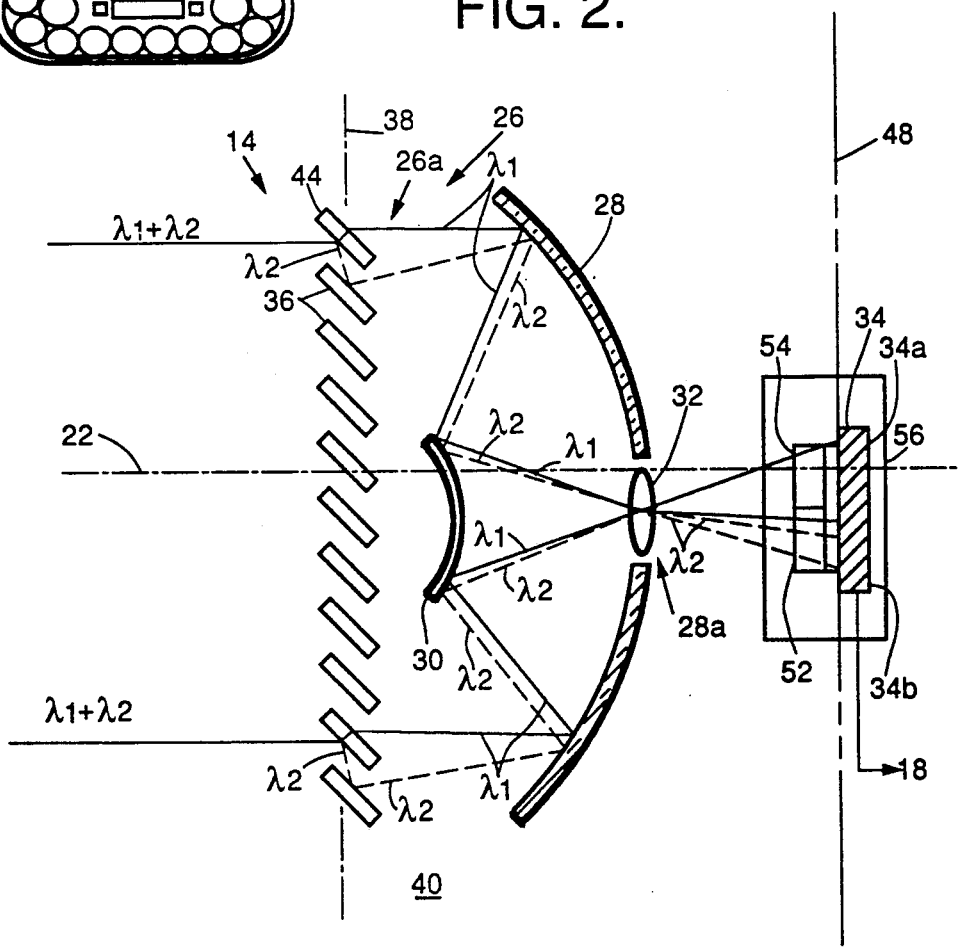
FIG. 2 is a simplified sectional view illustrating the present imaging apparatus.

As illustrated in FIG. 2, the imaging apparatus 14 includes a Cassegrain-type telescope 26 having an angular field-of-view on the order of 2°. Optical radiation from the target 16 is incident on the apparatus 14 along the axis 22, which is also the optical axis of the telescope 26. The telescope 26 includes a concave first mirror 28, a convex second mirror 30, and a relay lens system symbolically illustrated as including converging lenses 32a and 32b which focus non-inverted optical images of the target 16 through a central hole 28a in the mirror 28 onto a focal plane photodetector array 34.

Although the telescope 26 is described and shown as being of the Cassegrain type, it will be understood that the present invention may be practiced using other types of optical focussing apparatus such as refracting telescopes, although not specifically illustrated.

In accordance with the present invention, a plurality of inclined dichroic plates 36 are disposed closely adjacent to an entrance aperture 26a of the telescope 26 in a "Venetian-blind" arrangement. The plates 36 may be fabricated using conventional technology such that they transmit first electromagnetic radiation in a first optical wavelength band and reflect second electromagnetic radiation in a second optical wavelength band.

Preferably, the plates 36 are constructed to transmit the longer wavelength radiation and reflect the shorter wavelength radiation, although the invention is not so limited. The particular wavelength bands selected are not the subject matter of the present invention, and may include, for example, visible light (0.4–0.7 micrometers), MWIR (3–5 micrometers), and LWIR (8–12 micrometers) in any combination.

For the purpose of describing the invention, it will be assumed that the first (short) wavelength radiation which is transmitted by the plates 36 is visible light in a wavelength band designated as $\lambda_1$, and that the second (long) wavelength radiation which is reflected by the plates 36 is infrared (MWIR or LWIR) radiation in a wavelength band designated as $\lambda_2$.

With reference further being made to FIGS. 3 and 4, optical radiation including the first radiation $\lambda_1$ and second radiation $\lambda_2$ is incident on the apparatus 14 along the axis 22. The plates 36 are spaced from each other along an axis 38 which is perpendicular to the axis 22. The axes 22 and 38 define a plane 40, which coincides with the plane of FIG. 3 and is perpendicular to the plane of FIG. 4. The plates 36 are elongated and extend perpendicular to the plane 40, as illustrated in FIG. 4. In a typical missile tracking application in which the entrance aperture 26a has a diameter of 2.5–7.6 centimeters, the number of plates 36 provided will be approximately six to twelve.

As best seen in FIG. 3, the plates 36 have lower or first surfaces 36a which face the target 16, and upper or second surfaces 36b which are parallel to the surfaces 36a and face the array 34. Each two plates 36 which are adjacent to each other along the axis 38 constitutes a pair of plates 36, with one pair being labeled 42 in FIG. 3. The uppermost plate 36 is further designated as an end plate 44. The upper plate 36 of each pair 42 is further designated as a first plate 42a, and the lower plate 36 of each pair 42 is further designated as a second plate 42b. The upper left portion of each second plate 42b overlaps the lower right portion of each first plate 42a along the axis 38 so that there are no vertical spaces between adjacent plates 36 as viewed through the entrance aperture 26a of the telescope 26, and incident light is thereby prevented from entering the telescope 26 directly.

Light from the scene or target 16 including the spectrum of naturally occurring electromagnetic radiation including the first radiation $\lambda_1$ and the second radiation $\lambda_2$ is incident on the apparatus 14 parallel to and centered on the axis 22. The first radiation $\lambda_1$ is transmitted through the plates 36 after being refracted twice in opposite directions at the surfaces 36a and 36b, and enters the telescope 26 parallel to the axis 22.

The second radiation $\lambda_2$ is reflected generally downward from the first surface 36a of the first plate 42a of each pair 42, and subsequently reflected generally rightward from the second surface 36b of the second plate 42b of each pair 42. The plates 36 are inclined such that the second radiation $\lambda_2$ is reflected into the telescope 26 in a direction which deviates from the axis 22 (which is also the direction of the transmitted first radiation $\lambda_1$) by a predetermined angle $\alpha$. The angle $\alpha$ will be on the order of one-half the field of view of the telescope 26, in the present example approximately 1°.

The end plate 44 is inclined at an angle $\theta_0$ relative to the axis 22, which is selected in accordance with the dimensions of the telescope 26 and array 34 and the properties of the plates 36. Each respective plate 36 other than the end plate 44 is inclined relative to the axis 22 by an angle $\theta_n$ which is $\alpha/2$ greater than the angle of inclination of the plate 36 adjacent to the respective plate in the direction of the end plate 44, where n=1 to (k−1), and k is the number of plates 36. This relationship may also be expressed as $\theta_n = \theta_{n-1} + \alpha/2$.

The progressive increase in the angle $\theta_n$ is necessary to cause the plates 36 to reflect the second radiation $\lambda_2$ at the angle $\alpha$, and compensate for the increased angles of the preceding plates 36 in the direction of the end plate 44.

As illustrated in FIG. 5, the telescope 26 focusses a first optical image 46 constituted by the transmitted first radiation $\lambda_1$ onto an upper or first section 34a the array 34 in a focal plane 48 which coincides with the light receiving surface of the array 34. The telescope 26 further focusses a second optical image 50 constituted by the second radiation $\lambda_2$ onto a lower or second section 34b of the array 34 in the focal plane 48. The first image 46 is centered on the axis 22, whereas the second image 50 is laterally displaced downwardly from the first image 46 by a distance determined by the angle $\alpha$.

Typically, the array 34 is a rectangular focal plane photodetector array consisting of 256×256 photodetector elements (not shown). In this case, the angle $\alpha$ is selected such that the second image 50 will be displaced downwardly from the first image 46 by a distance corresponding to 256/2=128 elements. In this manner, the first image 46 is focussed on the first section 34a of the array 34, whereas the second image 50 is focussed on the second section 34b of the array 34, with each image 46 and 50 being 128 elements high and 256 elements wide.

Where the telescope 26 has a circularly symmetrical optical configuration, each image 46 and 50 will have an initial size corresponding to 256×256 elements. The lower 128×256 half (not shown) of the image 50 is focussed in the focal plane 48 below the array 34, and is not used. However, the undesired lower 128×256 half (not shown) of the image 46 overlaps the desired upper 128×256 half of the image 50.

In order to prevent the overlapping lower half of the image 46 from reaching the lower section 34b of the array 34, an optical bandpass filter 52 is provided in front of the section 34b which transmits the second radiation $\lambda_2$ therethrough, but blocks the first radiation $\lambda_1$.

In order to prevent any peripheral portion of the second image 50 from reaching the first section 34a of the array 34, another optical bandpass filter 54 is provided in front of the section 34a which transmits the first radiation $\lambda_1$ therethrough, but blocks the second radiation $\lambda_2$. The filters 52 and 54 ensure that the first and second images 46 and 50 consist of only the first radiation $\lambda_1$ and the second radiation $\lambda_2$ respectively.

The focal plane array 34 and filters 52 and 54 are mounted in a dewar 56. The array 34 generates electronic image signals which are fed to the tracking system 18 for guidance of the missile 10.

The first and second sections 34a and 34b may be 128×256 portions of an integral focal plane array. Alternatively, the first and second sections 34a and 34b may be different types of 128×256 focal plane photodetector arrays which are mounted adjacent to each other in the focal plane 48 as illustrated. The size and type of the array 34 are not the particular subject matter of the present invention, and are selected in accordance with a particular application. For example, a charge-coupled device (CCD) photodetector array is suitable for visible light, whereas a mercury-cadmium-telluride (HgCdTe) based array is suitable for infrared radiation.

While several illustrative embodiments of the invention have been shown and described, numerous variations and alternate embodiments will occur to those skilled in the art, without departing from the spirit and scope of the invention.

For example, although the plates 36 are described and illustrated as being located at the entrance aperture 26a of the telescope 26, the plates 36 may alternatively be located at another position in the apparatus 14 at which the optical image is collimated, such as between the converging lenses 32a and 32b.

Accordingly, it is intended that the present invention not be limited solely to the specifically described illustrative embodiments. Various modifications are contemplated and can be made without departing from the spirit and scope of the invention as defined by the appended claims.

I claim:

1. A dual-band optical imaging apparatus for producing first and second optical images of a scene including first and second electromagnetic radiation in first and second optical wavelength bands respectively received from the scene, comprising:
   an assembly of inclined dichroic plates which transmit the first radiation therethrough in a first direction and reflect the second radiation therefrom in a second direction which is deviated from the first direction by a predetermined angle; and
   optical means for focussing the transmitted first radiation and reflected second radiation at a focal plane to produce the first and second optical images respectively;
   said predetermined angle being selected such that the first and second optical images are laterally displaced from each other by a predetermined distance in the focal plane.

2. An imaging apparatus as in claim 1, in which:
   the first and second radiation is incident on the plates along a first axis;
   the plates are spaced from each other along a second axis which perpendicularly intersects the first axis, and extend perpendicular to a plane defined by the first and second axes;
   each plate is inclined relative to the first axis such as to have a first surface which faces the scene and a second surface which faces the focal plane;
   each two adjacent plates constitute a pair of first and second plates such that the first surface of the first plate faces the second surface of the second plate; and
   each pair of plates reflects the second radiation from the first surface of the first plate and subsequently from the second surface of the second plate in the second direction.

3. An imaging apparatus as in claim 2, in which:
   the first and second surfaces of each plate are parallel to each other;
   the plates include an end plate having a second surface which does not face any of the other plates;
   the end plate is inclined relative to the first axis by a second predetermined angle; and
   each respective plate other than the end plate is inclined relative to the first axis by an angle which is one-half said predetermined angle greater than the angle of inclination of the plate adjacent to said respective plate in the direction of the end plate.

4. An imaging apparatus as in claim 1, further comprising optoelectronic sensor means disposed in the focal plane for producing electrical signals corresponding to the first and second optical images.

5. An imaging apparatus as in claim 4, in which the sensor means comprises an optoelectronic focal plane photodetector array.

6. An imaging apparatus as in claim 4, in which:
   the sensor means has a first section on which the first optical image is incident and a second section on which the second optical image is incident; and
   the imaging apparatus further comprises:

first optical filter means disposed between the optical means and the first section of the sensor means for transmitting the first radiation therethrough and blocking the second radiation; and second optical filter means disposed between the optical means and the second section of the sensor means for transmitting the second radiation therethrough and blocking the first radiation.

7. An imaging apparatus as in claim 1, in which the optical means is disposed between the plates and the focal plane.

8. An imaging apparatus as in claim 7, in which:
the optical means has an entrance aperture; and
the plates are disposed in a collimated image area of the optical means located adjacent to the entrance aperture.

9. An imaging apparatus as in claim 7, in which the optical means comprises a Cassegrain-type telescope.

10. An imaging apparatus as in claim 1, in which the plates are disposed in a collimated image area of the optical means.

11. An imaging apparatus as in claim 1, in which:
the optical means has a predetermined angular field-of-view; and
said predetermined angle is approximately one-half said field-of-view.

12. In a guided missile, a tracking system including a dual-band optical imaging apparatus for producing first and second optical images of a target including first and second electromagnetic radiation in first and second optical wavelength bands respectively received from the target, comprising:

an assembly of inclined dichroic plates which transmit the first radiation therethrough in a first direction and reflect the second radiation therefrom in a second direction which is deviated from the first direction by a predetermined angle; and optical means for focussing the transmitted first radiation and reflected second radiation at a focal plane to produce the first and second optical images respectively;

said predetermined angle being selected such that the first and second optical images are laterally displaced from each other by a predetermined distance in the focal plane.

13. A guided missile as in claim 12, in which:
the first and second radiation is incident on the plates along a first axis;
the plates are spaced from each other along a second axis which perpendicularly intersects the first axis, and extend perpendicular to a plane defined by the first and second axes;
each plate is inclined relative to the first axis such as to have a first surface which faces the target and a second surface which faces the focal plane;
each two adjacent plates constitute a pair of first and second plates such that the first surface of the first plate faces the second surface of the second plate; and
each pair of plates reflects the second radiation from the first surface of the first plate and subsequently from the second surface of the second plate in the second direction.

14. A guided missile as in claim 13, in which:
the first and second surfaces of each plate are parallel to each other;
the plates include an end plate having a second surface which does not face any of the other plates;
the end plate is inclined relative to the first axis by a second predetermined angle; and
each respective plate other than the end plate is inclined relative to the first axis by an angle which is one-half said predetermined angle greater than the angle of inclination of the plate adjacent to said respective plate in the direction of the end plate.

15. A guided missile as in claim 12, further comprising optoelectronic sensor means disposed in the focal plane for producing electrical signals corresponding to the first and second optical images.

16. A guided missile as in claim 15, in which the sensor means comprises an optoelectronic focal plane photodetector array.

17. A guided missile as in claim 15, in which:
the sensor means has a first section on which the first optical image is incident and a second section on which the second optical image is incident; and
the imaging apparatus further comprises:
first optical filter means disposed between the optical means and the first section of the sensor means for transmitting the first radiation therethrough and blocking the second radiation; and
second optical filter means disposed between the optical means and the second section of the sensor means for transmitting the second radiation therethrough and blocking the first radiation.

18. A guided missile as in claim 12, in which the optical means is disposed between the plates and the focal plane.

19. A guided missile as in claim 18, in which:
the optical means has an entrance aperture; and
the plates are disposed in a collimated image area of the optical means located adjacent to the entrance aperture.

20. A guided missile as in claim 18, in which the optical means comprises a Cassegrain-type telescope.

21. A guided missile as in claim 12, in which the plates are disposed in a collimated image area of the optical means.

22. A guided missile as in claim 12, in which:
the optical means has a predetermined angular field-of-view; and
said predetermined angle is approximately one-half said field-of-view.

23. A dual-band optical apparatus, comprising an assembly of inclined dichroic plates which transmit first radiation in a first optical wavelength band incident thereon from a scene therethrough in a first direction and reflect second radiation in a second optical wavelength band incident thereon from the scene therefrom in a second direction which is deviated from the first direction by a predetermined angle;
the first and second radiation is incident on the plates along a first axis;
the plates are spaced from each other along a second axis which perpendicularly intersects the first axis, and extend perpendicular to a plane defined by the first and second axes; and
each plate is inclined relative to the first axis such as to have a first surface which faces the scene and a second surface which faces away from the scene.

24. An apparatus as in claim 23, in which:
each two adjacent plates constitute a pair of first and second plates such that the first surface of the first plate faces the second surface of the second plate; and each pair of plates reflects the second radiation from the first surface of the first plate and subsequently from the second surface of the second plate in the second direction.

25. An imaging apparatus as in claim 24, in which:
the first and second surfaces of each plate are parallel to each other;
the plates include an end plate having a second surface which does not face any of the other plates;
the end plate is inclined relative to the first axis by a second predetermined angle; and
each respective plate other than the end plate is inclined relative to the first axis by an angle which is one-half said predetermined angle greater than the angle of inclination of the plate adjacent to said respective plate in the direction of the end plate.

* * * * *